US008466868B2

(12) United States Patent
Lee et al.

(10) Patent No.: US 8,466,868 B2
(45) Date of Patent: Jun. 18, 2013

(54) ORGANIC LIGHT EMITTING DISPLAY DEVICE AND METHOD FOR DRIVING THE SAME

(75) Inventors: Kyoung-Soo Lee, Suwon-si (KR); Wook Lee, Suwon-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 804 days.

(21) Appl. No.: 12/319,625

(22) Filed: Jan. 7, 2009

(65) Prior Publication Data

US 2009/0219265 A1 Sep. 3, 2009

(30) Foreign Application Priority Data

Mar. 3, 2008 (KR) ........................ 10-2008-0019584

(51) Int. Cl.

*G09G 3/32* (2006.01)
*G09G 3/36* (2006.01)
*G09G 5/00* (2006.01)
*G06F 3/038* (2006.01)

(52) U.S. Cl.

USPC ............ 345/100; 345/204; 345/211; 345/82; 345/98; 345/99

(58) Field of Classification Search

USPC .............................. 345/204, 211, 82, 98–100
See application file for complete search history.

(56) References Cited

U.S. PATENT DOCUMENTS

| | | | | |
|---|---|---|---|---|
| 6,963,323 | B2 * | 11/2005 | Sakurai et al. | 345/89 |
| 2005/0225522 | A1 * | 10/2005 | Wu et al. | 345/87 |
| 2005/0237102 | A1 * | 10/2005 | Tanaka | 327/536 |
| 2007/0164935 | A1 * | 7/2007 | Lee | 345/76 |
| 2008/0211752 | A1 * | 9/2008 | Kim | 345/87 |
| 2008/0224980 | A1 * | 9/2008 | Senda et al. | 345/96 |
| 2009/0040159 | A1 * | 2/2009 | Morita | 345/92 |

FOREIGN PATENT DOCUMENTS

| | | | |
|---|---|---|---|
| JP | 58-107782 | A | 6/1983 |
| KR | 10-2001-0045522 | A | 6/2001 |
| KR | 10-2006-0029897 | A | 4/2006 |
| KR | 10-2006-0070709 | A | 6/2006 |
| KR | 10-2006-0085554 | A | 7/2006 |
| KR | 10-0626133 | B1 | 9/2006 |
| KR | 10-2007-0027263 | A | 3/2007 |
| KR | 10-0797749 | B1 | 1/2008 |

OTHER PUBLICATIONS

Korean Office Action dated Jun. 29, 2009 for Korean Patent Application No. KR 10-2008-0019584 which corresponds to captioned U.S. Appl. No. 12/319,625.

* cited by examiner

*Primary Examiner* — Bipin Shalwala
*Assistant Examiner* — Ilana Spar
(74) *Attorney, Agent, or Firm* — Knobbe, Martens, Olson & Bear LLP

(57) ABSTRACT

An organic light emitting display device having low power consumption is disclosed. Power in the device is saved by precharging data lines if the data of the current frame has a higher voltage than the data of the previous frame. Accordingly, if the data lines are precharged the data line driving buffer does not need to use as much power.

19 Claims, 3 Drawing Sheets

ORGANIC LIGHT EMITTING DISPLAY DEVICE AND METHOD FOR DRIVING THE SAME

CROSS-REFERENCE TO RELATED APPLICATION

This application claims priority to and the benefit of Korean Patent Application No. 10-2008-0019584, filed on Mar. 3, 2008, in the Korean Intellectual Property Office, the entire content of which is incorporated herein by reference.

BACKGROUND

1. Field

The field relates to an organic light emitting display device and a method of driving the same, and more particularly to an organic light emitting display device having low power consumption, and a method of driving the same.

2. Description of the Related Technology

In recent years, various flat panel displays have been developed. The flat panel displays are light-weight and small-sized as compared with cathode ray tubes. Of the flat panel display devices, the organic light emitting display device is viewed as a next-generation display device because the organic light emitting display device has excellent luminance and color purity using an organic compound as a light emitting material.

An organic light emitting display device is thin, light-weight and driven with low power consumption, and therefore it has been expected that the organic light emitting display device may be widely used in the field of portable display devices, etc.

However, the organic light emitting display device consumes a large amount of electric current to emit bright light since the light is emitted according to the amount of the electric current.

Accordingly, it is necessary to further reduce power consumption of the organic light emitting display device so as to apply to the field of various display devices.

SUMMARY OF CERTAIN INVENTIVE ASPECTS

One aspect is organic light emitting display device. The device includes a pixel unit having a plurality of pixels disposed near intersection points of scan lines and data lines, and a data driver configured to generate a data signal corresponding to received data and a data drive power source and to supply the generated data signal to the data lines. The data driver includes a data signal generation unit configured to generate a data signal corresponding to the received data, a buffer unit configured to receive the data signal and to generate a buffered data signal, a switch unit to selectively couple the data lines to the data drive power source or the buffer unit, and a controller configured to control the switch unit.

Another aspect is a method of driving an organic light emitting display device. The method includes dividing a data input period, during which a data signal is supplied to a plurality of data lines, into a plurality of periods, precharging the data lines by coupling the data lines to an input line of a data drive power source during one or more periods of the plurality of the periods, and charging the data signal in the data lines by coupling the data lines to an output line of an amplifier during the other of the plurality of periods.

Another aspect is an organic light emitting display device. The device includes a pixel unit with a plurality of pixels, each pixel associated with at least one data line, and a data driver configured to precharge the data lines if the data lines are to be driven with a voltage higher than the voltage with which the data lines were driven in the previous driving period.

BRIEF DESCRIPTION OF THE DRAWINGS

The accompanying drawings, together with the specification, illustrate exemplary embodiments, and, together with the description, serve to explain certain inventive aspects.

DETAILED DESCRIPTION OF CERTAIN INVENTIVE EMBODIMENTS

Figure 1:
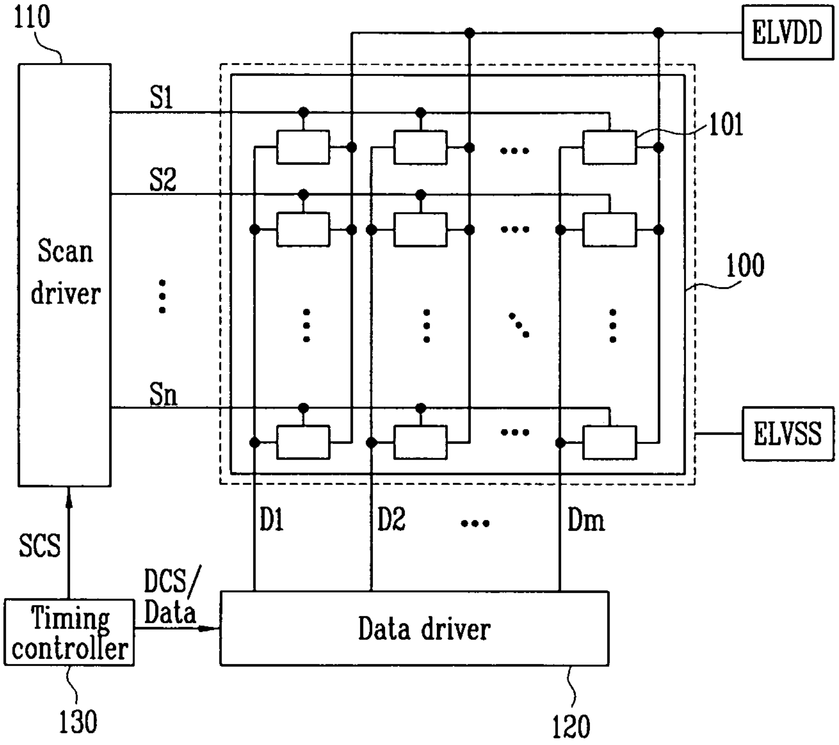
FIG. 1 is a block diagram showing an organic light emitting display device according to one exemplary embodiment.

Hereinafter, certain exemplary embodiments will be described with reference to the accompanying drawings. Here, when a first element is described as being coupled to a second element, the first element may be not only directly coupled to the second element but may also be indirectly coupled to the second element via a third element. Further, some of the elements that are not essential to the complete understanding of the invention are omitted for clarity. Also, like reference numerals generally refer to like elements throughout.

FIG. 1 is a block diagram showing an organic light emitting display device according to one exemplary embodiment.

Referring to FIG. 1, the organic light emitting display device includes a pixel unit 100, a scan driver 110, a data driver 120, and a timing controller 130.

The pixel unit 100 includes a plurality of pixels 101 disposed near intersection points of scan lines (S1 to Sn) and data lines (D1 to Dm).

Each of the pixels 101 receives a data signal from the data lines (D1 to Dm) when a scan signal is supplied from the scan lines (S1 to Sn). Each of the pixels 101 further receives first and second pixel power sources (ELVDD and ELVSS) from for example, a power supply unit (not shown). The pixels 101 display an image by emitting the light with luminance corresponding to the data signal.

The scan driver 110 receives a scan drive power source, and receives a scan drive control signal (SCS) from the timing controller 130 to generate a scan signal. The scan signal generated in the scan driver 110 is sequentially supplied to the scan lines (S1 to Sn).

The data driver 120 receives a data drive power source, and receives a data drive control signal (DCS) and data (Data) from the timing controller 130 to generate a data signal. The data signal generated in the data driver 120 is supplied to the data lines (D1 to Dm) and are generally synchronized with the scan signal. That is to say, the data driver 120 supplies one line (one row) of the data signal during every horizontal period.

The data signal supplied to the data lines (D1 to Dm) is transmitted to the pixels 101 selected by the scan signal. Then, each of the pixels 101 emits the light with luminance corresponding to the data signal.

The timing controller 130 generates a scan drive control signal (SCS) and a data drive control signal (DCS) according to the synchronizing signals. The scan drive control signal (SCS) generated in the timing controller 130 is supplied to the scan driver 110, and the data drive control signal (DCS) is supplied to the data driver 120. The scan drive control signal (SCS) may include a gate start pulse, a gate shift clock, a gate output enable signal, and the like. The data drive control signal (DCS) may include a source start pulse, a source shift clock, a source output enable signal, and the like. Also, the timing controller 130 supplies data (Data) to the data driver 120.

Figure 2:
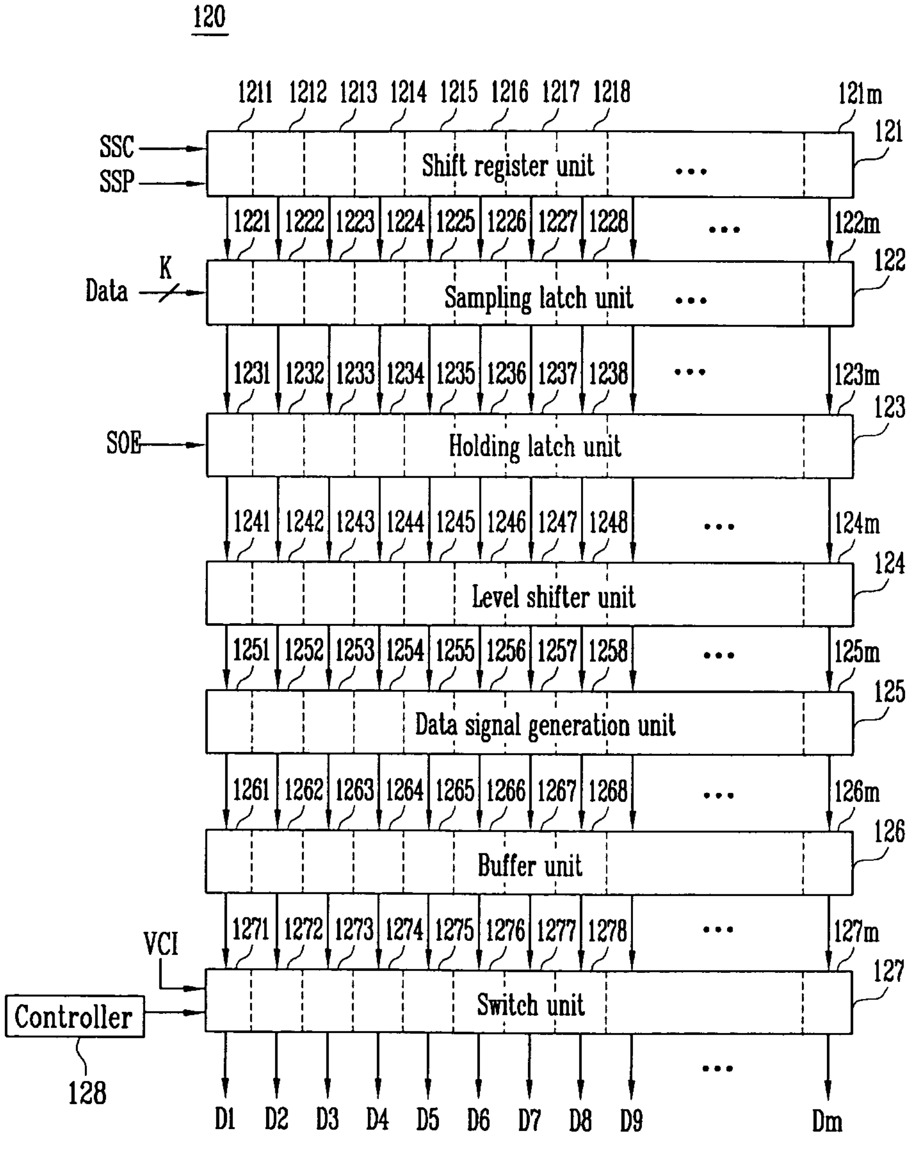
FIG. 2 is a block diagram showing a data driver shown in FIG. 1.

FIG. 2 is a block diagram showing a data driver shown in FIG. 1.

Referring to FIG. 2, the data driver 120 according to one exemplary embodiment includes a shift register unit 121, a sampling latch unit 122, a holding latch unit 123, a level shifter unit 124, a data signal generation unit 125, a buffer unit 126, a switch unit 127, and a controller 128.

The shift register unit 121 receives a source shift clock (SSC) and a source start pulse (SSP) from the timing controller 130. The shift register unit 121 receiving the source shift clock (SSC) and the source start pulse (SSP) shifts a source start pulse (SSP) to correspond to the source shift clock (SSC). Therefore, the shift register unit 121 sequentially generates m (m is an integer) sampling signals. For this purpose, the shift register unit 121 includes m shift registers (1211 to 121*m*).

The sampling latch unit 122 sequentially stores data (Data) supplied to the sampling latch unit 122 to correspond to the sampling signal sequentially supplied from the shift register unit 121. For this purpose, the sampling latch unit 122 includes m sampling latches 1221 to 122*m* to store m data (Data). Here, each of the sampling latches 1221 to 122*m* is set to a size to store k-bit data (Data).

The holding latch unit 123 receives data (Data) form the sampling latch unit 122 in response to a source output enable (SOE) signal supplied from the timing controller 130, and temporally stores the source output enable (SOE) signal. The holding latch unit 123 supplies the stored data (Data) to a level shifter unit 124 at the same time. For this purpose, the holding latch unit 123 includes m holding latches 1231 to 123*m*. Here, each of the holding latches 1231 to 123*m* is set to a size to store k-bit data (Data).

The level shifter unit 124 expands a voltage range of the data (Data) by shifting up or shifting down a voltage level of the data (Data) supplied from the holding latch unit 123. For this purpose, the level shifter unit 124 includes m level shifters 1241 to 124*m*. The data (Data) whose voltage range is expanded in the level shifter unit 124 is supplied to the data signal generation unit 125.

The data signal generation unit 125 generates a data signal corresponding to a bit value (or grey level value) of the data (Data), and supplies the generated data signal to the buffer unit 126. For this purpose, the data signal generation unit 125 includes m digital-analog converters (DAC) 1251 to 125*m*, one disposed in each channel.

The buffer unit 126 transmits a data signal to the data lines (D1 to Dm) through the switch unit 127, the data signal being supplied from the data signal generation unit 125. For this purpose, the buffer unit 126 includes m output amplifiers 1261 to 126*m*, one disposed in each channel.

The switch unit 127 selectively couples the data lines (D1 to Dm) to either the output lines of the output amplifiers 1261 to 126*m* during a data input period, or a power supply voltage for buffer unit 126, where the data input period is a period that a data signal is supplied to the data lines (D1 to Dm) according to the control signal supplied from the controller 128. In the embodiment shown, the power supply voltage for buffer unit 126 is provided to the switch unit 127 via input VCI. The switch unit 127 includes m switches 1271 to 127*m*, one disposed in each channel to selectively couple the data lines (D1 to Dm) to the output lines of the output amplifiers 1261 to 126*m* or to the buffer unit 126.

The controller 128 generates a control signal controlling the switch unit 127, and supplies the generated control signal to the switch unit 127. Configurations and operations of the buffer unit 126, the switch unit 127 and the controller 128 will be described later in more detail.

Figure 3:
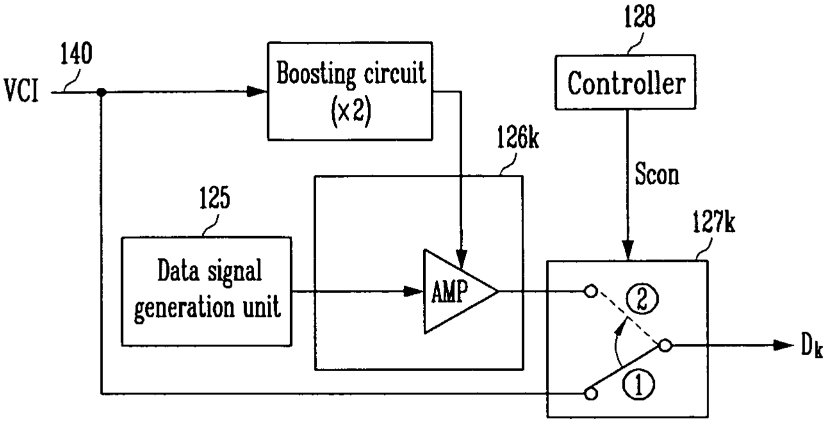
FIG. 3 is a block diagram showing a buffer unit and a switch unit shown in FIG. 2.

FIG. 3 is a block diagram showing a data signal generation unit 125, a buffer unit 126*k* and a switch unit 127*k* such as those shown in FIG. 2. A $k^{th}$ channel of the switch unit 127 and the buffer unit 126 to supply a data signal to a $k^{th}$ data line (Dk) are shown in FIG.3.

Referring to FIG. 3, the buffer unit 126*k* includes an output amplifier (hereinafter, referred to as an AMP) 126*k* coupled to an output of the data signal generation unit 125. AMP 126*k* amplifies and supplies an electric current while substantially maintaining a voltage level of the data signal supplied from the data signal generation unit 125.

Here, a drive power source having a voltage level greater than the voltage level of the data signal should be supplied to the AMP 126*k* so as to drive the AMP 126*k*. However, a voltage level of the data drive power source (VCI) supplied from the power supply unit may be lower than the voltage level to drive the AMP 126*k*. Therefore, a boosting circuit to boost the data drive power source (VCI) is further provided in the data driver 120 in this case. The AMP 126*k* is driven by receiving a boost power source boosted in the boosting circuit.

For example, assume that a voltage level of the data signal is in a range of 1 to 4.2 V, and a voltage level of the data drive power source (VCI) supplied from the power supply unit is 2.8 V. A boosting circuit may be provided in the data driver 120, where the boosting circuit functioning to boost a voltage level of the data drive power source (VCI) by a factor of two to supply a drive power source of 5.6V for AMP 126*k*. In this case, if an electric current consumed at AMP 126*k* is I (mA), an input current of the data drive power source (VCI) needs 2I (mA) or more. That is to say, when a data signal is supplied to the data line (Dk) by coupling the data line (Dk) to the output lines of the AMP 126*k* during a data input period, an electric current consumed in the AMP 126*k* is increased, which leads to the increase in the power consumption.

Therefore, a switch unit 127 coupled between the buffer unit 126 and the data lines (D) is provided to prevent the increase in the power consumption. Switch unit 127 includes a switch 127*k* to selectively couple the data line (Dk) to an output line of the AMP 126*k* or an input line 140 of the data drive power source (VCI).

An operation of the switch unit 127 will be described. As an example, the data signal of the previous frame has a lower voltage level than the data signal of the current frame. In this case, the switch unit 127 may precharge the data line (Dk) and/or the storage capacitors of the pixels according to the control signal (Scon) supplied from the controller 128 by coupling the data line (Dk) to the input line 140 of the data drive power source (VCI) as shown in $\hat{1}$ of FIG. 3 during one period of the data input period. The switch unit 127 may supply a data signal to the data line (Dk) by coupling the data line (Dk) to an output line of the AMP 126*k* as shown in $\hat{2}$ of FIG. 3 during other periods of the data input period.

As described above, when the data input period is divided into a plurality of periods and the data line (Dk) and/or the storage capacitor of the pixel are precharged during one period, a current path is formed in the output line of the AMP 126*k* during the precharge period, and therefore it is possible to reduce consumption in the electric current of the AMP 126*k*. That is to say, the power consumption of the organic light emitting display device may be reduced since the boost power source to boost a data drive power source (VCI) is not used during the precharge period.

In addition, an operation of the switch unit 127 will be described where the data signal of the previous frame has a higher voltage level than the data signal of the current frame. In this case, the switch unit 127 couples the data line (Dk) only to output line of the AMP 126*k*, but not to the input line 140 of the drive power source (VCI) during the data input period. Therefore, it is possible to prevent a voltage level of the data line (Dk) from being unnecessarily reduced to the data drive power source (VCI) in this case.

The operation of the switch unit 127 is carried out by the control signal (Scon) supplied from the controller 128. For this purpose, the controller 128 is configured as shown in FIG. 4.

Figure 4:
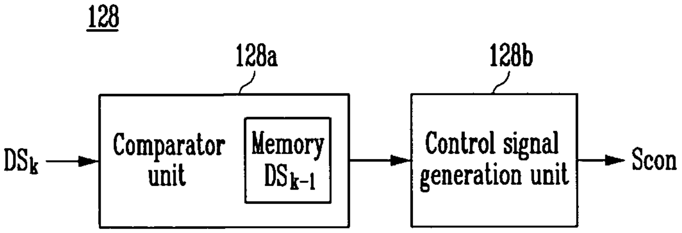
FIG. 4 is a block diagram showing a controller shown in FIGS. 2 and 3.

FIG. 4 is a block diagram showing a controller shown in FIGS. 2 and 3.

Referring to FIG. 4, the controller 128 includes a comparator unit 128*a* and a control signal generation unit 128*b*.

The comparator unit 128*a* receives a data signal during every frame period, and outputs a comparison signal by comparing the data signal of the previous frame with the data signal (voltage level) of the current frame. For this purpose, the comparator unit 128*a* includes a memory to store frame data signals.

The control signal generation unit 128*b* generates a control signal (Scon) corresponding to the comparison signal supplied from the comparator unit 128*a*, the control signal (Scon) functioning to control the switch unit 127.

An operation of the controller 128 will be described where the data signal of the previous frame has a lower voltage level than the data signal of the current frame. In this case, the controller 128 couples the data line (Dk) to the input line 140 of the data drive power source (VCI) during one period out of the data input period. The controller 128 controls the switch unit 127 so that the data line (Dk) can be coupled to the output line (an output line of the AMP 126*k*) of the buffer unit 126 during the other periods.

Also, the operation of the controller 128 will be described where the data signal of the previous frame has a higher voltage level than the data signal of the current frame. In this case, the controller 128 controls the switch unit 127 so that the data line (Dk) is coupled to the output line (an output line of the AMP 126*k)* of the buffer unit 126 during the data input period.

Figure 5:
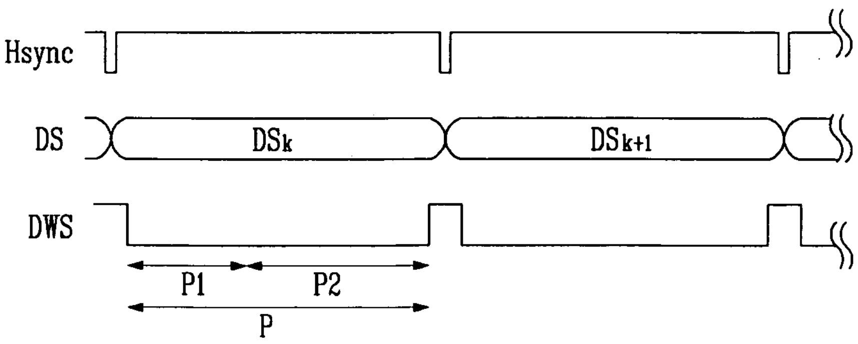
FIG. 5 is a timing diagram showing a method for driving an organic light emitting display device according to one exemplary embodiment.

FIG. 5 is a timing view showing a method for driving an organic light emitting display device according to one exemplary embodiment.

Referring to FIG. 5, a data input period (P) in which a data write signal (DWS) to control the supply time of the data signal (Data signal, DS) is set within a first horizontal period as defined by the horizontal synchronizing signal (Hsync).

However, when a data signal of the previous frame has a lower voltage level than a data signal of the current frame, the data input period (P) is divided into a plurality of periods. The data lines (D) and/or the storage capacitors of the pixels are precharged by coupling the data lines (D) to the input lines 140 of the data drive power source (VCI) during one period (P1) out of the plurality of periods. Then, the data signal is charged in-the data lines (D) by coupling the data lines (D) to output lines of the AMP in the buffer unit 126 during the other data input period (P2), the buffer unit 126 being coupled to an output end of the data signal generation unit 125.

The procedure is preferably carried out only when the data signal of the previous frame has a lower voltage level than the data signal of the current frame. Therefore, a step to generate a control signal controlling the precharging of the data lines (D) and/or the storage capacitors of the pixels by comparing a voltage level of the data signal of the previous frame with a voltage level of the data signal of the current frame should be carried out prior to the step to generate a control signal.

While the present invention has been described in connection with certain exemplary embodiments, it is to be understood that the invention is not limited to the disclosed embodiments, but, on the contrary, is intended to cover various modifications and equivalent arrangements.

What is claimed is:

1. An organic light emitting display device, comprising:
- a pixel unit including a plurality of pixels disposed near intersection points of scan lines and data lines; and
- a data driver configured to generate a data signal corresponding to received data and to a power voltage, wherein the power voltage is based on a voltage of a data drive power source, wherein the power voltage is different from the voltage of the data drive power source, and wherein the data driver is further configured to supply the generated data signal to the data lines, wherein the data driver comprises:
- a data signal generation unit configured to generate a data signal corresponding to the received data;
- a boosting circuit configured to generate the power voltage based on the voltage of the data drive power source;
- a buffer unit configured to receive the data signal and to generate a buffered data signal;
- a switch unit configured to selectively couple the data lines either directly to the data drive power source or to the buffer unit; and
- a controller configured to control the switch unit.

2. The organic light emitting display device according to claim 1, wherein the controller comprises a comparator unit configured to output a comparison signal based on comparing a data signal of a current frame with a data signal of the previous frame; and a control signal generation unit to generate a control signal that controls the switch unit according to the comparison signal.

3. The organic light emitting display device according to claim 1, wherein the controller controls the switch unit so that the data lines are coupled to the input line of the data drive power source during one period of the data input period and the data lines are coupled to the output line of the buffer unit during another period of the data input period if the data signal of the previous frame has a lower voltage level than the data signal of the current frame.

4. The organic light emitting display device according to claim 1, wherein the controller controls the switch unit so that the data lines are coupled to the output line of the buffer unit if the data signal of the previous frame has a higher voltage level than the data signal of the current frame.

5. The organic light emitting display device according to claim 1, wherein the buffer unit is coupled between the data signal generation unit and the switch unit, and comprises an output amplifier driven by the boosting circuit.

6. A method of driving an organic light emitting display device, the method comprising:
- dividing a data input period, during which a data signal is supplied to a plurality of data lines, into a plurality of periods;

precharging the data lines by coupling the data lines to an input line of a boosting circuit during one or more periods of the plurality of the periods;

generating a power voltage based on a voltage at the input line;

generating the data signal based on the power voltage with an amplifier; and supplying the data signal to the data lines by coupling the data lines to an output line of the amplifier during the other of the plurality of periods.

7. The method of driving an organic light emitting display device according to claim 6, further comprising generating a control signal that controls the precharging of the data lines by comparing a voltage level of a data signal of a current frame with a voltage level of a data signal of the previous frame.

8. The method of driving an organic light emitting display device according to claim 7, wherein the data lines are precharged if the data signal of the previous frame has a lower voltage level than the data signal of the current frame.

9. The method of driving an organic light emitting display device according to claim 7, wherein the data lines are not precharged if the data signal of the previous frame does not have a lower voltage level than the data signal of the current frame.

10. The method of driving an organic light emitting display device according to claim 7, wherein the data lines are driven with voltages corresponding to input data if the data signal of the previous frame does not have a lower voltage level than the data signal of the current frame.

11. An organic light emitting display device, comprising:

a pixel unit including a plurality of pixels, each pixel associated with at least one data line;

a data driver configured to precharge the data lines if the data lines are to be driven with a voltage higher than the voltage with which the data lines were driven in the previous driving period, wherein the data lines are precharged by connecting the data lines directly to a power source of the data driver;

a data buffer, configured to drive the data lines with data voltages, wherein the data voltages are based on received data and on a power voltage, wherein the power voltage is based on a voltage of the data driver power source, and wherein the power voltage is different from the voltage of the data driver power source; and a boosting circuit configured to generate the power voltage based on the voltage of the data driver power source.

12. The display of claim 11, wherein the data driver is configured to drive the data lines with voltages corresponding to input data subsequent to precharging the data lines.

13. The display of claim 11, wherein the data driver is configured to not precharge the data lines if the data lines are to be driven with a voltage which is not higher than the voltage with which the data lines were driven in the previous frame.

14. The display of claim 11, wherein the data driver is configured to precharge the data lines to a voltage provided by a power supply.

15. The display of claim 11, wherein the data driver comprises a plurality of switches, wherein each switch is configured to connect one of the data lines to either the data driver power source or the data buffer.

16. The display of claim 15, wherein the voltage of the data driver power source is substantially equal to half of the power voltage.

17. The display of claim 11, wherein the data driver comprises:

a comparator unit configured to output a comparison signal based on comparing a data signal of a current frame with a data signal of the previous frame; and a control signal generation unit to generate a control signal that indicates whether the data lines are to be precharged.

18. The display of claim 11, wherein the data driver is configured to drive the data lines during a plurality of time periods, wherein during at least one of the time periods the data lines are conditionally precharged, and during others of the time periods the data lines are driven with voltages corresponding to input data.

19. The display of claim 18, wherein the data driver is configured to drive the data lines with voltages corresponding to input data during the at least one time period for conditionally precharging the data lines if the data lines are to not be precharged.

* * * * *